(12) United States Patent
Goto et al.

(10) Patent No.: US 11,548,503 B2
(45) Date of Patent: Jan. 10, 2023

(54) VEHICLE CONTROL SYSTEM

(71) Applicant: TOYOTA JIDOSHA KABUSHIKI KAISHA, Toyota (JP)

(72) Inventors: Takayuki Goto, Yokohama (JP); Yoshinori Watanabe, Isehara (JP); Nobuhide Kamata, Susono (JP); Kazuyuki Fujita, Gotemba (JP); Masahiro Harada, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 17/028,232

(22) Filed: Sep. 22, 2020

(65) Prior Publication Data
US 2021/0107478 A1   Apr. 15, 2021

(30) Foreign Application Priority Data
Oct. 15, 2019   (JP) .............................. JP2019-188897

(51) Int. Cl.
| | |
|---|---|
| *B60W 30/10* | (2006.01) |
| *B60W 30/02* | (2012.01) |
| *B60W 30/182* | (2020.01) |
| *B60W 50/00* | (2006.01) |

(52) U.S. Cl.
CPC .......... *B60W 30/10* (2013.01); *B60W 30/02* (2013.01); *B60W 30/182* (2013.01); *B60W 2050/0073* (2013.01); *B60W 2710/18* (2013.01); *B60W 2710/20* (2013.01)

(58) Field of Classification Search
CPC ............................................... B60W 2050/007
See application file for complete search history.

(56) References Cited

U.S. PATENT DOCUMENTS

| | | | | |
|---|---|---|---|---|
| 2014/0288832 A1* | 9/2014 | Hoch | ................. | G01C 21/3469 |
| | | | | 701/538 |
| 2015/0224987 A1* | 8/2015 | Tachibana | .............. | G08G 1/166 |
| | | | | 701/1 |
| 2017/0329338 A1* | 11/2017 | Wei | ........................ | B60W 30/09 |

(Continued)

FOREIGN PATENT DOCUMENTS

| | | |
|---|---|---|
| JP | 2017-114195 A | 6/2017 |
| WO | 2018/179359 A1 | 10/2018 |

*Primary Examiner* — Jeff A Burke
*Assistant Examiner* — Jerrod Irvin Davis
(74) *Attorney, Agent, or Firm* — Sughrue Mion, PLLC

(57) ABSTRACT

A vehicle travel control device executes vehicle travel control such that a vehicle follows a target trajectory. An automated driving control device generates a first target trajectory that is the target trajectory for automated driving of the vehicle. The vehicle travel control device further determines whether or not an activation condition of travel assist control is satisfied. When the activation condition is satisfied, the vehicle travel control device generates a second target trajectory that is the target trajectory for the travel assist control. When the second target trajectory is generated during the automated driving, the vehicle travel control device determines whether or not a cancellation condition is satisfied. When the cancellation condition is satisfied, the vehicle travel control device cancels both the first target trajectory and the second target trajectory, and decelerates the vehicle.

1 Claim, 16 Drawing Sheets

(56) References Cited

U.S. PATENT DOCUMENTS

| | | | |
|---|---|---|---|
| 2019/0146508 A1* | 5/2019 | Dean | G05D 1/0285 |
| | | | 701/26 |
| 2019/0155293 A1* | 5/2019 | Oniwa | G05D 1/0223 |
| 2020/0207354 A1* | 7/2020 | Ishioka | B60W 10/18 |
| 2020/0377083 A1 | 12/2020 | Kokaki et al. | |
| 2021/0031760 A1* | 2/2021 | Ostafew | B60W 30/09 |
| 2021/0048817 A1* | 2/2021 | Olson | B60W 40/114 |

* cited by examiner

VEHICLE CONTROL SYSTEM

BACKGROUND

Technical Field

The present disclosure relates to a vehicle control system that controls a vehicle performing automated driving. In particular, the present disclosure relates to a vehicle control system that controls a vehicle to follow a target trajectory.

Background Art

Patent Literature 1 discloses a vehicle control device. The vehicle control device executes first control (collision avoidance control) that avoids a collision between the vehicle and an obstacle. Furthermore, the vehicle control device executes second control such as cruise control and lane keeping control. The vehicle control device recognizes an obstacle around the vehicle, and determines whether or not a predetermined collision avoidance condition is satisfied based on a result of the recognition. When it is determined that the collision avoidance condition is satisfied during execution of the second control, the vehicle control device stops the second control and executes the first control.

LIST OF RELATED ART

Patent Literature 1: Japanese Laid-Open Patent Application Publication No. 2017-114195

SUMMARY

Vehicle travel control that controls steering, acceleration, and deceleration of a vehicle is considered. During automated driving of the vehicle, a target trajectory is generated by an automated driving system that manages the automated driving. Then, the vehicle travel control is executed so that the vehicle follows the target trajectory for the automated driving.

Meanwhile, it is also envisioned that a "travel assist control function" which assists vehicle travel not constantly but as needed basis is applied to the vehicle. The travel assist control function controls at least one of the steering, the acceleration, and the deceleration of the vehicle as needed basis. There is room for further consideration as to how to execute the vehicle travel control when such the travel assist control is activated during the automated driving.

As an example, let us consider a situation where a steering direction required by the travel assist control function is opposite to a steering direction required to follow the target trajectory for the automated driving. In such the situation, it is not always easy to determine which one of the steering directions to employ. The reason is that a cause for the inconsistency in the steering directions is not always clear. There is room for further consideration as to how to execute the vehicle travel control under such the situation.

An object of the present disclosure is to provide a new control law when a travel assist control function which assists vehicle travel as needed basis is applied to a vehicle performing automated driving.

In an aspect of the present disclosure, a vehicle control system that controls a vehicle performing automated driving is provided.

The vehicle control system includes:
a vehicle travel control device configured to execute vehicle travel control that controls steering, acceleration, and deceleration of the vehicle such that the vehicle follows a target trajectory; and
an automated driving control device configured to generate a first target trajectory being the target trajectory for the automated driving of the vehicle.

The vehicle travel control device is further configured to:
determine whether or not an activation condition of travel assist control is satisfied, wherein the travel assist control controls at least one of the steering, the acceleration, and the deceleration for at least one of improving safety or comfort of travel of the vehicle, reducing a sense of strangeness or insecurity of an occupant of the vehicle, and stabilizing behavior of the vehicle; and
generate a second target trajectory being the target trajectory for the travel assist control when the activation condition is satisfied.

When the second target trajectory is generated during the automated driving, the vehicle travel control device determines whether or not a cancellation condition for cancelling both the first target trajectory and the second target trajectory is satisfied.

When the cancellation condition is satisfied, the vehicle travel control device cancels both the first target trajectory and the second target trajectory, and decelerates the vehicle.

The automated driving control device generates the first target trajectory for the automated driving of the vehicle. The vehicle travel control device generates the second target trajectory for the travel assist control when the activation condition of the travel assist control is satisfied. When the second target trajectory is generated during the automated driving, the vehicle travel control device determines whether or not the cancellation condition for cancelling both the first target trajectory and the second target trajectory is satisfied. When the cancellation condition is satisfied, the vehicle travel control device cancels both the first target trajectory and the second target trajectory, and decelerates the vehicle. Since the vehicle decelerates, at least safety of vehicle travel and/or stability of vehicle behavior is improved as compared with a case where the vehicle does not decelerate.

EMBODIMENTS

Embodiments of the present disclosure will be described below with reference to the attached drawings.

1. OUTLINE

Figure 1:
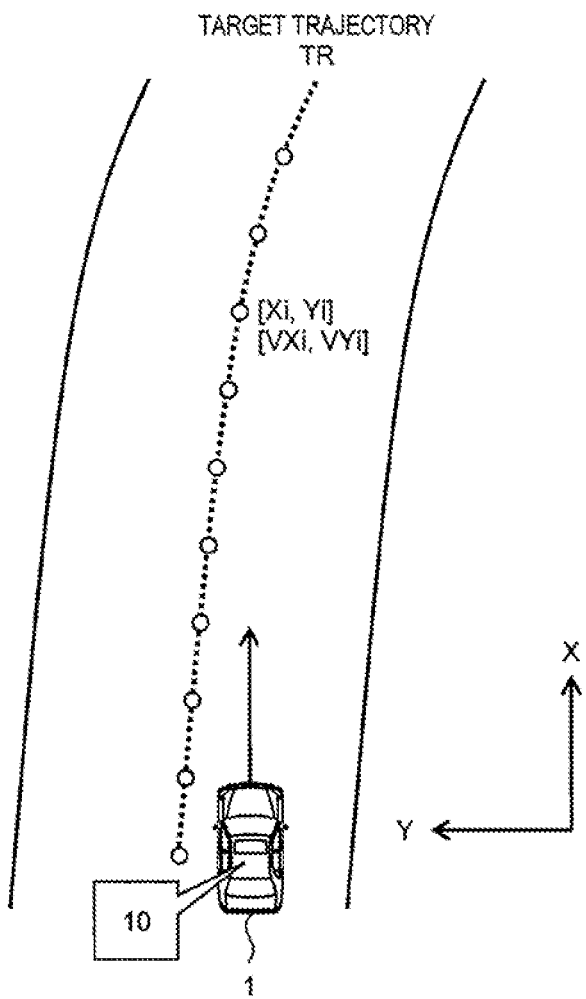
FIG. 1 is a conceptual diagram for explaining an outline of a vehicle control system according to an embodiment of the present disclosure.

FIG. 1 is a conceptual diagram for explaining an outline of a vehicle control system 10 according to the present embodiment. The vehicle control system 10 controls a vehicle 1. Typically, the vehicle control system 10 is installed on the vehicle 1. Alternatively, at least a part of the vehicle control system 10 may be placed in an external device outside the vehicle 1 and remotely control the vehicle 1. That is, the vehicle control system 10 may be distributed in the vehicle 1 and the external device.

The vehicle 1 is an automated driving vehicle capable of automated driving. The automated driving here means one where a driver does not necessarily have to 100% concentrate on driving (e.g., so-called Level 3 or more automated driving).

The vehicle control system 10 manages the automated driving of the vehicle 1. Moreover, the vehicle control system 10 executes "vehicle travel control" that controls steering, acceleration, and deceleration of the vehicle 1. In particular, during the automated driving, the vehicle control system 10 executes the vehicle travel control such that the vehicle 1 follows a target trajectory TR.

The target trajectory TR includes at least a set of target positions[Xi, Yi] of the vehicle 1 in a road on which the vehicle 1 travels. In the example shown in FIG. 1, an X-direction is a forward direction of the vehicle 1, and a Y-direction is a plane direction orthogonal to the X-direction. However, the coordinate system (X, Y) is not limited to the example shown in FIG. 1. The target trajectory TR may further include a target velocity[VXi, VYi] for each target position[Xi, Yi]. The target trajectory TR may include control range information such as upper and lower limits of the target position[Xi, Yi] and the target velocity[VXi, VYi], and desired traveling position range information. In order to make the vehicle 1 follow such the target trajectory TR, the vehicle control system 10 calculates a deviation (e.g., a lateral deviation, a yaw angle deviation, a velocity deviation, etc.) between the vehicle 1 and the target trajectory TR, and then performs the vehicle travel control such that the deviation decreases.

Figure 2:
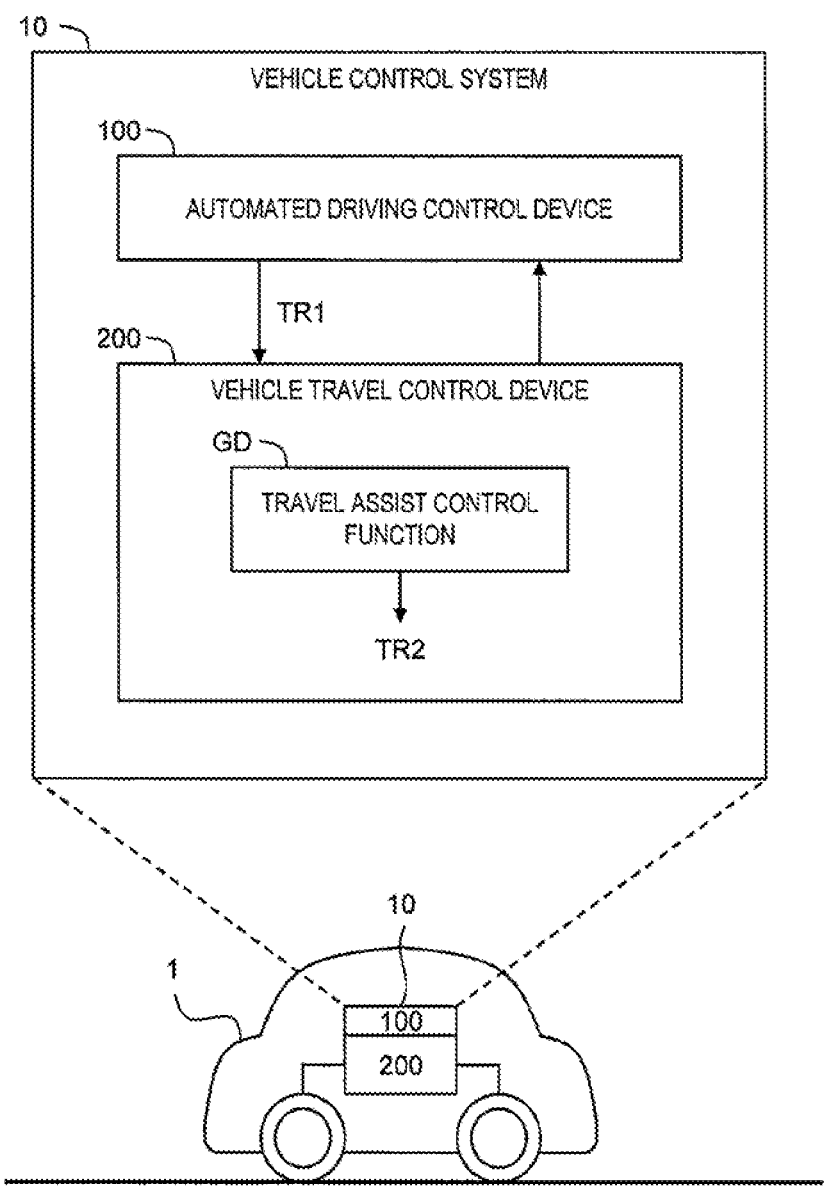
FIG. 2 is a block diagram schematically showing a configuration of the vehicle control system according to the embodiment of the present disclosure.

FIG. 2 is a block diagram schematically showing a configuration of the vehicle control system 10 according to the present embodiment. The vehicle control system 10 includes an automated driving control device 100 and a vehicle travel control device 200. The automated driving control device 100 and the vehicle travel control device 200 may be physically-separated devices, or may be an identical device. When the automated driving control device 100 and the vehicle travel control device 200 are physically-separated devices, they exchange necessary information via communication.

The automated driving control device 100 is responsible for management of the automated driving of the vehicle 1 among the functions of the vehicle control system 10. In particular, the automated driving control device 100 generates the target trajectory TR for the automated driving of the vehicle 1. For example, the automated driving control device 100 uses a sensor to detect (recognize) a situation around the vehicle 1. Then, the automated driving control device 100 generates a travel plan of the vehicle 1 during the automated driving based on a destination and the situation around the vehicle 1. The travel plan includes maintaining a current travel lane, making a lane change, avoiding an obstacle, and so forth. The automated driving control device 100 then generates the target trajectory TR required for the vehicle 1 to travel in accordance with the travel plan.

The target trajectory TR for the automated driving generated by the automated driving control device 100 is hereinafter referred to as a "first target trajectory TR1." The automated driving control device 100 outputs the generated first target trajectory TR1 to the vehicle travel control device 200.

On the other hand, the vehicle travel control device 200 is responsible for the vehicle travel control among the functions of the vehicle control system 10. That is, the vehicle travel control device 200 controls the steering, the acceleration, and the deceleration of the vehicle 1. In particular, the vehicle travel control device 200 controls the steering, the acceleration, and the deceleration of the vehicle 1 such that the vehicle 1 follows the target trajectory TR. In order to make the vehicle 1 follow the target trajectory TR, the vehicle travel control device 200 calculates a deviation (e.g., a lateral deviation, a yaw angle deviation, a velocity deviation, etc.) between the vehicle 1 and the target trajectory TR, and then performs the vehicle travel control such that the deviation decreases.

During the automated driving of the vehicle 1, the vehicle travel control device 200 receives the first target trajectory TR1 from the automated driving control device 100. Basically, the vehicle travel control device 200 executes the vehicle travel control such that the vehicle 1 follows the first target trajectory TR1.

The vehicle travel control device 200 according to the present embodiment further has a function of "travel assist control" (travel assist control function GD) that assists travel of the vehicle 1. More specifically, the travel assist control controls at least one of the steering, the acceleration, and the deceleration of the vehicle 1 for at least one of improving safety or comfort of travel of the vehicle 1, reducing a sense of strangeness or insecurity of an occupant of the vehicle 1, and stabilizing behavior of the vehicle 1. Such the travel assist control is exemplified by collision avoidance control, lane departure suppression control, damping control, vehicle stability control, and the like. The collision avoidance control assists avoidance of a collision between the vehicle 1 and a surrounding object (namely, an avoidance target). The lane departure suppression control suppresses the vehicle 1 from departing from a travel lane. The damping control suppresses pitching and rolling of the vehicle 1. The vehicle stability control suppresses unstable behavior such as vehicle spin.

The vehicle travel control device 200 uses sensors to detect a situation around the vehicle 1 and a state of the vehicle 1. Then, based on the detection result, the vehicle travel control device 200 (the travel assist control function GD) determines whether or not it is necessary to activate the travel assist control. In other words, the vehicle travel control device 200 determines whether or not an "activation condition" for activating the travel assist control is satisfied. When the activation condition is satisfied, the vehicle travel control device 200 (the travel assist control function GD) generates the target trajectory TR for the travel assist control. The target trajectory TR for the travel assist control generated by the vehicle travel control device 200 is hereinafter referred to as a "second target trajectory TR2."

When the activation condition of the travel assist control is satisfied and the second target trajectory TR2 is generated during the automated driving, both the first target trajectory TR1 for the automated driving and the second target trajectory TR2 for the travel assist control are generated coincidentally. The first target trajectory TR1 and the second target trajectory TR2 are not necessarily consistent with each other. There is room for further consideration as to how to execute the vehicle travel control under such the situation.

Figure 3:
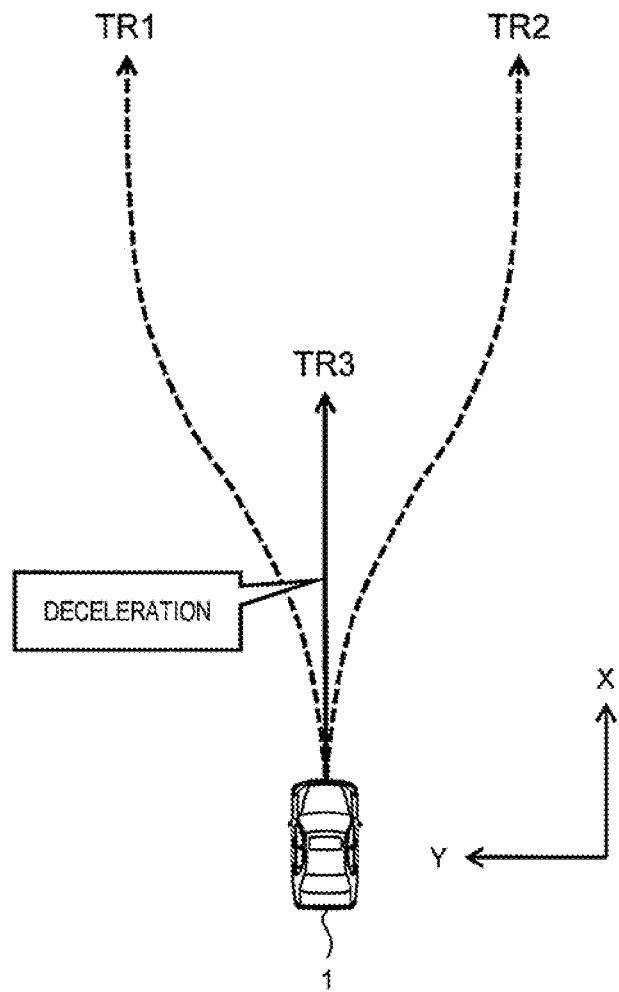
FIG. 3 is a conceptual diagram for explaining the outlie of the vehicle control system according to the embodiment of the present disclosure.

As an example, FIG. 3 shows a situation where the first target trajectory TR1 and the second target trajectory TR2 contradict each other. A first steering direction is a steering direction required for the vehicle 1 to follow the first target trajectory TR1. On the other hand, a second steering direction is a steering direction required for the vehicle 1 to follow the second target trajectory TR2. The first steering direction and the second steering direction are opposite to each other.

In the situation shown in FIG. 3, it is not always easy to determine which one of the first steering direction and the second steering direction to employ. The reason is that a cause for the inconsistency between the first steering direction and the second steering direction is not always clear. For example, there is a possibility that the automated driving control device 100 is temporarily in a bad condition. There is another possibility that the travel assist control function GD is temporarily in a bad condition. Alternatively, there is still another possibility that terrain around the vehicle 1 is very complicated and thus accuracy of the automated driving control device 100 or the travel assist control function GD is temporarily deteriorated.

In view of the above, the vehicle travel control device 200 according to the present embodiment cancels (abandons) both the first target trajectory TR1 and the second target trajectory TR2 in the situation shown in FIG. 3. Instead, the vehicle travel control device 200 executes the vehicle travel control such that the vehicle 1 decelerates. Preferably, the vehicle travel control device 200 executes the vehicle travel control such that the vehicle 1 decelerates and stops. In either case, since the vehicle 1 decelerates, at least safety of vehicle travel and/or stability of vehicle behavior is improved as compared with a case where the vehicle 1 does not decelerate.

The vehicle travel control device 200 may generate a "third target trajectory TR3" that is the target trajectory TR for decelerating the vehicle 1. When generating the third target trajectory TR3, the vehicle travel control device 200 executes the vehicle travel control such that the vehicle 1 follows the third target trajectory TR3.

Figure 4:
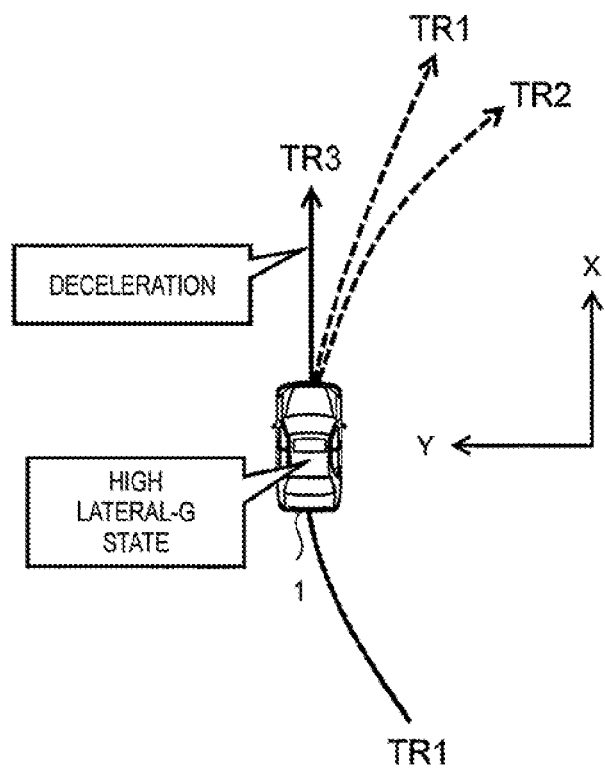
FIG. 4 is a conceptual diagram for explaining the outlie of the vehicle control system according to the embodiment of the present disclosure.

FIG. 4 shows another example. In the example, the vehicle 1 during the automated driving makes a sharp turn and is in a high lateral acceleration state. That is, a first lateral acceleration required for the vehicle 1 to follow the first target trajectory TR1 is higher than a predetermined lateral acceleration threshold.

In such the high lateral acceleration state, the activation condition of the travel assist control is satisfied and the second target trajectory TR2 is generated. However, in the case shown in FIG. 4, a sharper turn is required for the vehicle 1 to follow the second target trajectory TR2. That is, a second lateral acceleration required for the vehicle 1 to follow the second target trajectory TR2 is further higher than the first lateral acceleration. This is not desirable in terms of stable behavior of the vehicle 1. There is a possibility that the travel assist control function GD is temporarily in a bad condition.

In view of the above, the vehicle travel control device 200 according to the present embodiment cancels (abandons) both the first target trajectory TR1 and the second target trajectory TR2 in the situation shown in FIG. 4 as well. Instead, the vehicle travel control device 200 executes the vehicle travel control such that the vehicle 1 decelerates. Preferably, the vehicle travel control device 200 executes the vehicle travel control such that the vehicle 1 decelerates and stops. As a result, it is expected that the high lateral acceleration state is resolved and thus the vehicle behavior is stabilized.

A generalization is as follows. A condition for cancelling both the first target trajectory TR1 and the second target trajectory TR2 is hereinafter referred to as a "cancellation condition." When the second target trajectory TR2 is generated during the automated driving of the vehicle 1, the vehicle travel control device 200 determines whether or not the cancellation condition is satisfied. When the cancellation condition is satisfied, the vehicle travel control device 200 cancels both the first target trajectory TR1 and the second target trajectory TR2, and decelerates the vehicle 1. Since the vehicle 1 decelerates, at least safety of vehicle travel and/or stability of vehicle behavior is improved as compared with a case where the vehicle 1 does not decelerate.

The automated driving control device 100 and the vehicle travel control device 200 may be separately designed and developed. For example, the vehicle travel control device 200 responsible for the vehicle travel control is designed and developed by an automaker. On the premise of utilizing the vehicle travel control device 200, an automated driving service provider can design and develop software for the automated driving control device 100. In that sense, it can be said that the vehicle travel control device 200 is a platform for automated driving services.

Hereinafter, the vehicle control system 10 according to the present embodiment will be described in more detail.

2. AUTOMATED DRIVING CONTROL DEVICE 100

2-1. Configuration Example

Figure 5:
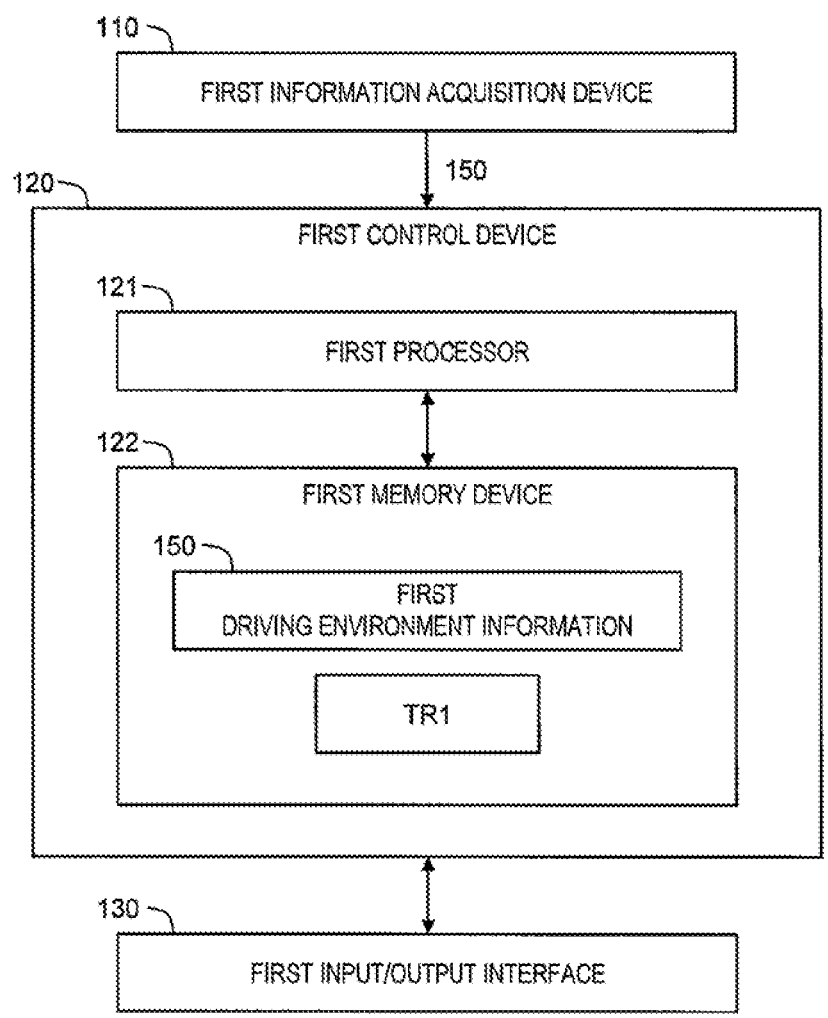
FIG. 5 is a block diagram showing a configuration example of an automated driving control device according to the embodiment of the present disclosure.

FIG. 5 is a block diagram showing a configuration example of the automated driving control device 100 according to the present embodiment. The automated driving control device 100 is provided with a first information acquisition device 110, a first control device 120, and a first input/output interface 130.

The first information acquisition device 110 acquires first driving environment information 150. The first driving environment information 150 is information indicating a driving environment for the vehicle 1 and necessary for the automated driving of the vehicle 1.

Figure 6:
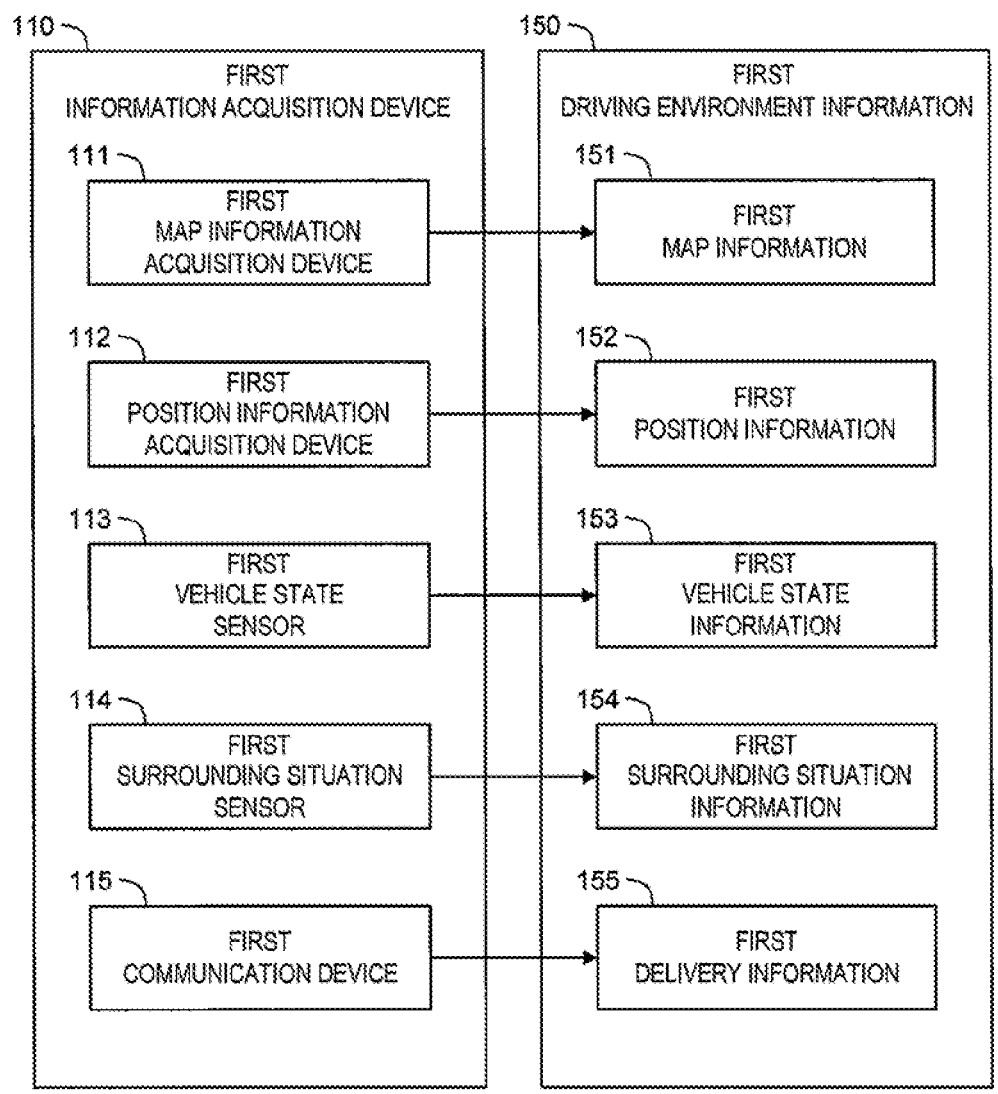
FIG. 6 is a block diagram showing an example of a first information acquisition device and first driving environment information in the automated driving control device according to the embodiment of the present disclosure.

FIG. 6 is a block diagram showing an example of the first information acquisition device 110 and the first driving environment information 150. The first information acquisition device 110 includes a first map information acquisition device 111, a first position information acquisition device 112, a first vehicle state sensor 113, a first surrounding situation sensor 114, and a first communication device 115. The first driving environment information 150 includes first map information 151, first position information 152, first vehicle state information 153, first surrounding situation information 154, and first delivery information 155.

The first map information acquisition device 111 acquires the first map information 151. The first map information 151 indicates a lane configuration and a road shape. The first map information acquisition device 111 acquires the first map information 151 of a necessary area from a map database. The map database may be stored in a predetermined memory device mounted on the vehicle 1, or may be stored in a management server outside the vehicle 1. In the latter case, the first map information acquisition device 111 communicates with the management server to acquire the necessary first map information 151.

The first position information acquiring device 112 acquires the first position information 152 indicating a position and an orientation of the vehicle 1. For example, the first position information acquiring device 112 includes a GPS (Global Positioning System) device for measuring the position and the orientation of the vehicle 1. The first position information acquisition device 112 may perform well-known localization to increase accuracy of the first position information 152.

The first vehicle state sensor 113 acquires the first vehicle state information 153 indicating a state of the vehicle 1. For example, the first vehicle state sensor 113 includes a vehicle speed sensor, a yaw rate sensor, an acceleration sensor, a steering angle sensor, and the like. The vehicle speed sensor detects a vehicle speed (i.e., a speed of the vehicle 1). The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle (a wheel turning angle) of the vehicle 1.

The first surrounding situation sensor 114 recognizes (detects) a situation around the vehicle 1. For example, the first surrounding situation sensor 114 includes at least one of a camera, a LIDAR (Laser Imaging Detection and Ranging), and a radar. The first surrounding situation information 154 indicates a result of recognition by the first surrounding situation sensor 114. For example, the first surrounding situation information 154 includes target information about a target recognized by the first surrounding situation sensor 114. The target is exemplified by a surrounding vehicle, a pedestrian, a roadside structure, an obstacle, a white line (lane marking), and the like. The target information includes information on a relative position and a relative velocity of the target with respect to the vehicle 1.

The first communication device 115 communicates with the outside of the vehicle 1. For example, the first communication device 115 communicates with an external device outside of the vehicle 1 via a communication network. The first communication device 115 may perform V2I communication (vehicle-to-infrastructure communication) with a surrounding infrastructure. The first communication device 115 may perform V2V communication (vehicle-to-vehicle communication) with a surrounding vehicle. The first delivery information 155 is information acquired through the first communication device 115. For example, the first delivery information 155 includes information on the surrounding vehicle and road traffic information (e.g., road work zone information, accident information, traffic restriction information, traffic jam information, etc.).

It should be noted that a part of the first information acquisition device 110 may be included in the vehicle travel control device 200. That is, the automated driving control device 100 and the vehicle travel control device 200 may share a part of the first information acquisition device 110. In that case, the automated driving control device 100 and the vehicle travel control device 200 exchange necessary information with each other.

Referring again to FIG. 5, the first input/output interface 130 is communicably connected with the vehicle travel control device 200.

The first control device 120 (i.e., a first controller) is an information processing device for executing a variety of processing. For example, the first control device 120 is a microcomputer. The first control device 120 is also called an ECU (Electronic Control Unit). More specifically, the first control device 120 includes a first processor 121 and a first memory device 122.

A variety of information is stored in the first memory device 122. For example, the first driving environment information 150 acquired by the first information acquisition device 110 is stored in the first memory device 122. The first memory device 122 is exemplified by a volatile memory, a nonvolatile memory, an HDD (Hard Disk Drive), and the like.

The first processor 121 executes automated driving software which is a computer program. The automated driving software is stored in the first memory device 122 or recorded on a computer-readable recording medium. The functions of the first control device 120 (the first processor 121) are realized by the first processor 121 executing the automated driving software.

According to the present embodiment, the first control device 120 (the first processor 121) is responsible for the management of the automated driving of the vehicle 1. In particular, the first control device 120 generates the first target trajectory TR1 for the automated driving of the vehicle 1. Hereinafter, generating the first target trajectory TR1 will be described in more detail.

2-2. Generating First Target Trajectory

Figure 7:
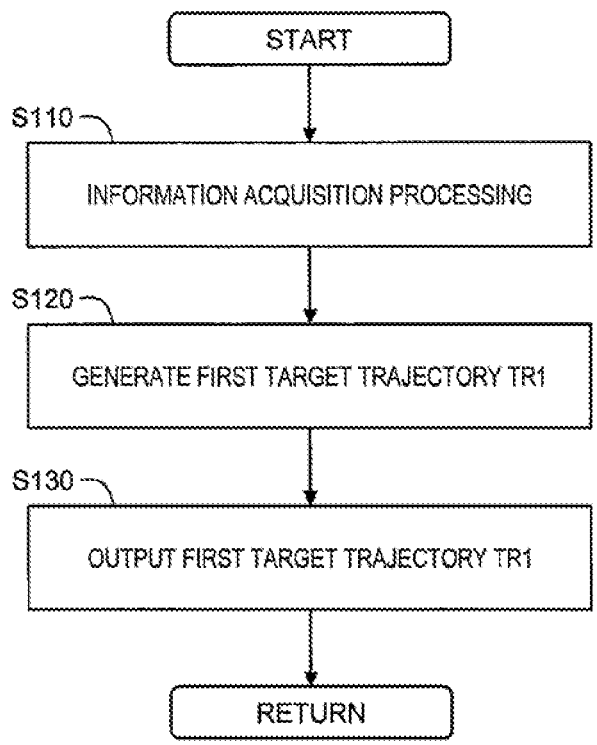
FIG. 7 is a flow chart showing processing by the automated driving control device according to the embodiment of the present disclosure.

FIG. 7 is a flow chart showing processing by the first control device 120 (the first processor 121) of the automated driving control device 100 according to the present embodiment. During the automated driving of the vehicle 1, the process flow shown in FIG. 7 is repeatedly executed at a regular interval.

In Step S110, the first control device 120 acquires the first driving environment information 150 from the first information acquisition device 110. The first driving environment information 150 is stored in the first memory device 122.

In Step S120, the first control device 120 generates the first target trajectory TR1 for the automated driving of the vehicle 1, based on the first driving environment information 150. More specifically, the first control device 120 generates a travel plan of the vehicle 1 during the automated driving, based on the first driving environment information 150. The travel plan includes maintaining a current travel lane, making a lane change, avoiding an obstacle, and so forth. Then, the first control device 120 generates the first target trajectory TR1 required for the vehicle 1 to travel in accordance with the travel plan, based on the first driving environment information 150.

For example, the first control device 120 generates the first target trajectory TR1 for traveling while maintaining a current travel lane. More specifically, based on the first map information 151 (the lane configuration) and the first position information 152, the first control device 120 recognizes a travel lane in which the vehicle 1 is traveling and acquires a configuration shape of the travel lane ahead of the vehicle 1. Alternatively, based on the first surrounding situation information 154, the first control device 120 may recognize a lane marking (i.e., a white line) of the travel lane and recognize a configuration shape of the travel lane ahead of the vehicle 1. Then, the first control device 120 generates the first target trajectory TR1 for traveling while maintaining the travel lane, based on the configuration shape of the travel lane ahead of the vehicle 1.

As another example, the first control device 120 may generate the first target trajectory TR1 for making a lane change. More specifically, based on the first map information 151 (the lane configuration), the first position information 152, and a destination, the first control device 120 plans to make a lane change in order to reach the destination. Then, the first control device 120 generates the first target trajectory TR1 for realizing the lane change, based on the first map information 151 (the lane configuration), the first position information 152, the first vehicle state information 153, and the first surrounding situation information 154 (the positions of other vehicles).

As yet another example, the first control device 120 may generate the first target trajectory TR1 for avoiding a collision between the vehicle 1 and a surrounding object. More specifically, based on the first surrounding situation information 154 (the target information), the first control device 120 recognizes an avoidance target (e.g., a surrounding vehicle, a pedestrian) ahead of the vehicle 1. Furthermore, based on the first vehicle state information 153 and the first surrounding situation information 154 (the target information), the first control device 120 predicts respective future positions of the vehicle 1 and the avoidance target and calculates a possibility that the vehicle 1 collides with the avoidance target. If the possibility that the vehicle 1 collides with the avoidance target is equal to or higher than a threshold, the first control device 120 generates the first target trajectory TR1 for avoiding the collision based on the first vehicle state information 153 (the target information) and the first surrounding situation information 154. Typically, the first target trajectory TR1 for avoiding the collision demands at least one of the steering and the deceleration.

In Step S130, the first control device 120 outputs the generated first target trajectory TR1 to the vehicle travel control device 200 via the first input/output interface 130. Every time the first target trajectory TR1 is updated, the latest first target trajectory TR1 is output to the vehicle travel control device 200.

3. VEHICLE TRAVEL CONTROL DEVICE 200

3-1. Configuration Example

Figure 8:
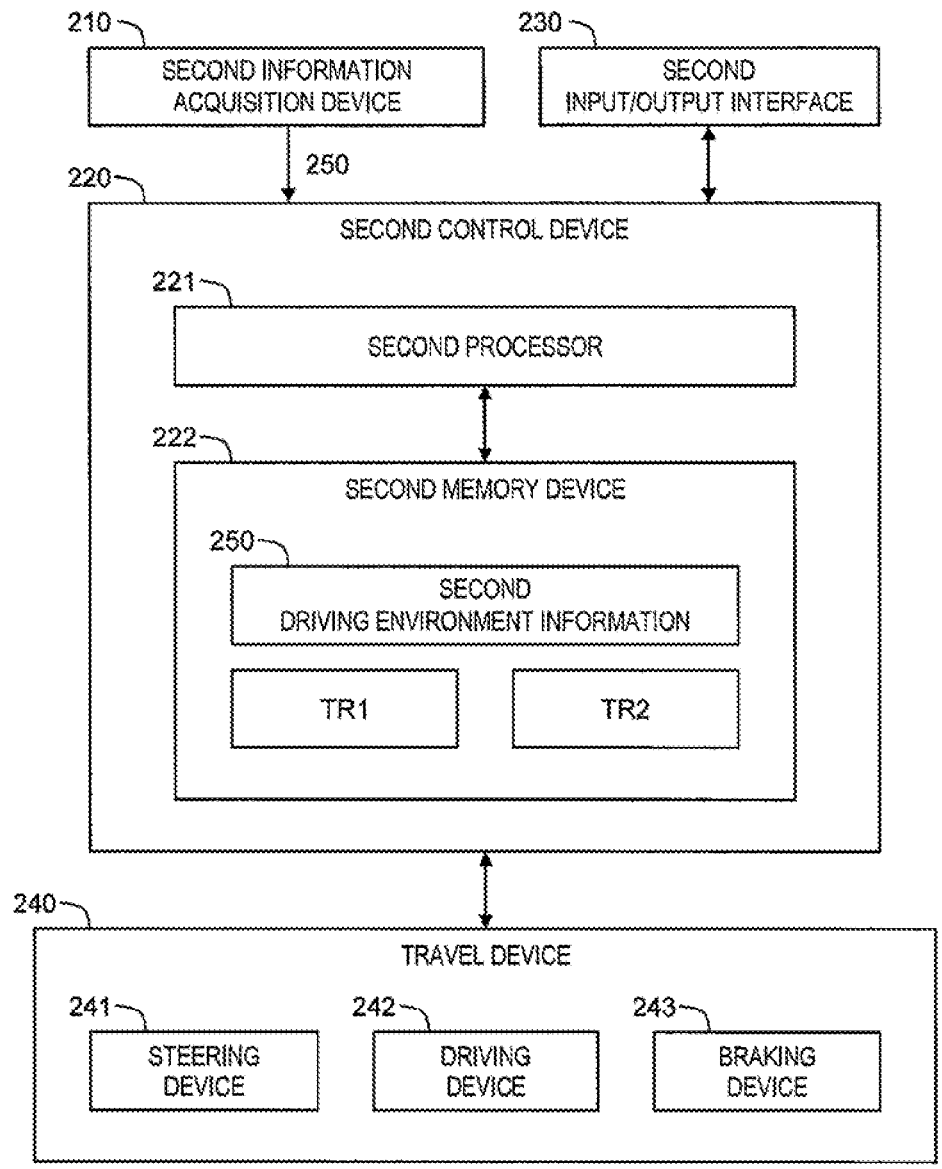
FIG. 8 is a block diagram showing a configuration example of a vehicle travel control device according to the embodiment of the present disclosure.

FIG. 8 is a block diagram showing a configuration example of the vehicle travel control device 200 according to the present embodiment. The vehicle travel control device 200 is provided with a second information acquisition device 210, a second control device 220, a second input/output interface 230, and a travel device 240.

The second information acquisition device 210 acquires second driving environment information 250. The second driving environment information 250 is information indicating a driving environment for the vehicle 1 and necessary for the vehicle travel control and the travel assist control by the vehicle travel control device 200.

Figure 9:
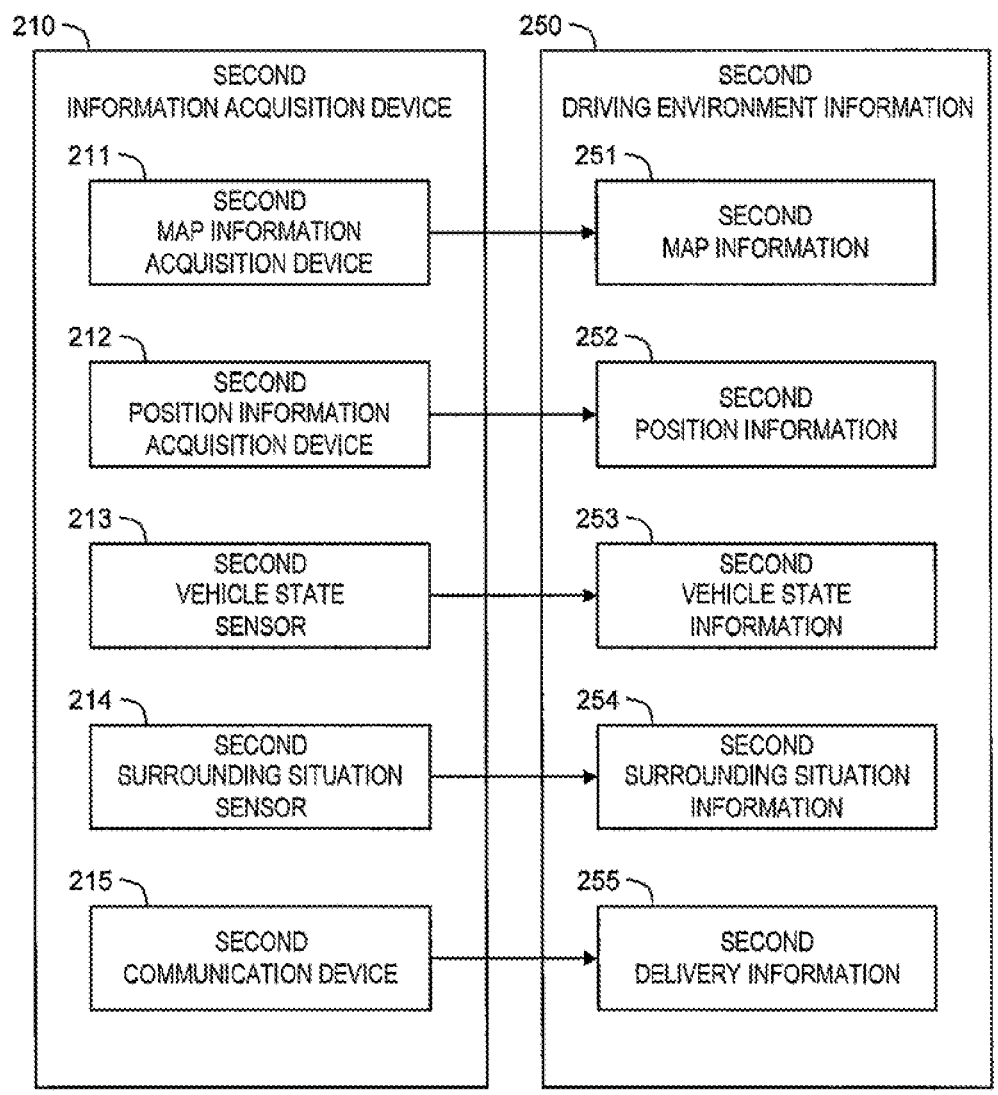
FIG. 9 is a block diagram showing an example of a second information acquisition device and second driving environment information in the vehicle travel control device according to the embodiment of the present disclosure.

FIG. 9 is a block diagram showing an example of the second information acquisition device 210 and the second driving environment information 250. The second information acquisition device 210 includes a second map information acquisition device 211, a second position information acquisition device 212, a second vehicle state sensor 213, a second surrounding situation sensor 214, and a second communication device 215. The second driving environment information 250 includes second map information 251, second position information 252, second vehicle state information 253, second surrounding situation information 254, and second delivery information 255.

The second map information acquisition device 211 acquires the second map information 251. The second map information 251 indicates a lane configuration and a road shape. The second map information acquisition device 211 acquires the second map information 251 of a necessary area from a map database. The map database may be stored in a predetermined memory device mounted on the vehicle 1, or may be stored in a management server outside the vehicle 1. In the latter case, the second map information acquisition device 211 communicates with the management server to acquire the necessary second map information 251.

The second position information acquiring device 212 acquires the second position information 252 indicating a position and an orientation of the vehicle 1. For example, the second position information acquiring device 212 includes a GPS device for measuring the position and the orientation of the vehicle 1. The second position information acquisition device 212 may perform well-known localization to increase accuracy of the second position information 252.

The second vehicle state sensor 213 acquires the second vehicle state information 253 indicating a state of the vehicle 1. For example, the second vehicle state sensor 213 includes a vehicle speed sensor, a yaw rate sensor, an acceleration sensor, a steering angle sensor, and the like. The vehicle speed sensor detects a vehicle speed (i.e., a speed of the vehicle 1). The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle (a wheel turning angle) of the vehicle 1.

The second surrounding situation sensor 214 recognizes (detects) a situation around the vehicle 1. For example, the second surrounding situation sensor 214 includes at least one of a camera, a LIDAR, and a radar. The second surrounding situation information 254 indicates a result of recognition by the second surrounding situation sensor 214. For example, the second surrounding situation information 254 includes target information about a target recognized by the second surrounding situation sensor 214. The target is exemplified by a surrounding vehicle, a pedestrian, a roadside structure, an obstacle, a white line (lane marking), and the like. The target information includes information on a relative position and a relative velocity of the target with respect to the vehicle 1.

The second communication device 215 communicates with the outside of the vehicle 1. For example, the second communication device 215 communicates with an external device outside of the vehicle 1 via a communication network. The second communication device 215 may perform V2I communication (vehicle-to-infrastructure communication) with a surrounding infrastructure. The second communication device 215 may perform V2V communication (vehicle-to-vehicle communication) with a surrounding vehicle. The second delivery information 255 is information acquired through the second communication device 215. For example, the second delivery information 255 includes information on the surrounding vehicle and road traffic information (e.g., road work zone information, accident information, traffic restriction information, traffic jam information, etc.).

It should be noted that the first information acquisition device 110 and the second information acquisition device 210 may be partially identical. For example, the first map information acquisition device 111 and the second map information acquisition device 211 may be identical. The first position information acquisition device 112 and the second position information acquisition device 212 may be identical. The first vehicle state sensor 113 and the second vehicle state sensor 213 may be identical. That is to say, the automated driving control device 100 and the vehicle travel control device 200 may share a part of the second information acquisition device 210. In that case, the automated driving control device 100 and the vehicle travel control device 200 exchange necessary information with each other.

Referring again to FIG. 8, the second input/output interface 230 is communicably connected with the automated driving control device 100.

The travel device 240 includes a steering device 241, a driving device 242, and a braking device 243. The steering device 241 turns (i.e., changes a direction of) a wheel of the vehicle 1. For example, the steering device 241 includes a power steering (EPS: Electric Power Steering) device. The driving device 242 is a power source that generates a driving force. The driving device 242 is exemplified by an engine, an electric motor, an in-wheel motor, and the like. The braking device 243 generates a braking force.

The second control device 220 (i.e., a second controller) is an information processing device for executing a variety of processing. For example, the second control device 220 is a microcomputer. The second control device 220 is also called an ECU. More specifically, the second control device 220 includes a second processor 221 and a second memory device 222.

A variety of information is stored in the second memory device 222. For example, the second driving environment information 250 acquired by the second information acquisition device 210 is stored in the second memory device 222. The second memory device 222 is exemplified by a volatile memory, a nonvolatile memory, an HDD, and the like.

The second processor 221 executes vehicle travel control software which is a computer program. The vehicle travel control software is stored in the second memory device 222 or recorded on a computer-readable recording medium. The functions of the second control device 220 (the second processor 221) are realized by the second processor 221 executing the vehicle travel control software.

3-2. Vehicle Travel Control

The second control device 220 (the second processor 221) executes the "vehicle travel control" that controls the steering, the acceleration, and the deceleration of the vehicle 1. The second control device 220 executes the vehicle travel control by controlling an operation of the travel device 240. More specifically, the second control device 220 controls the steering (turning of the wheel) of the vehicle 1 by controlling an operation of the steering device 241. The second control device 220 controls the acceleration of the vehicle 1 by controlling an operation of the driving device 242. The second control device 220 controls the deceleration of the vehicle 1 by controlling an operation of the braking device 243.

In particular, the second control device 220 executes the vehicle travel control such that the vehicle 1 follows the target trajectory TR. In this case, the second control device 220 calculates a deviation between the vehicle 1 and the target trajectory TR based on the target trajectory TR, the second position information 252, and the second vehicle state information 253. The deviation includes a lateral deviation (i.e., an Y-direction deviation), a yaw angle deviation (i.e., an azimuth angle deviation), and a velocity deviation. Then, the second control device 220 performs the vehicle travel control such that the deviation between the vehicle 1 and the target trajectory TR decreases.

In the vehicle travel control, the second control device 220 calculates a control amount for controlling the travel device 240, that is, a control amount of at least one of the steering, the acceleration, and the deceleration. The control amount required for the vehicle 1 to follow the target trajectory TR, that is, the control amount required for reducing the deviation between the vehicle 1 and the target trajectory TR is hereinafter referred to as a "required control amount CON." The required control amount CON is exemplified by a target steering angle, a target yaw rate, a target velocity, a target acceleration, a target deceleration, a target torque, a target current, and the like. The second control device 220 controls the operation of the travel device 240, that is, controls at least one of the steering, the acceleration, and the deceleration in accordance with the required control amount CON.

For example, the steering control using the steering device 241 is as follows. The second control device 220 calculates a target yaw rate required for reducing the deviation between the vehicle 1 and the target trajectory TR. Furthermore, the second control device 220 calculates a target steering angle according to a yaw rate deviation which is a difference between the target yaw rate and an actual yaw rate. The actual yaw rate is detected by the second vehicle state sensor 213 and included in the second vehicle state information 253. The target steering angle becomes larger as the yaw rate deviation becomes larger. Then, the second control device 220 performs feedback control of the steering device 241 such that an actual steering angle follows the target steering angle. The actual steering angle is detected by the second vehicle state sensor 213 and included in the second vehicle state information 253.

3-3. Processing Related to Travel Assist Control

The second control device 220 (the second processor 221) further executes the "travel assist control" that assists the travel of the vehicle 1. The travel assist control controls at least one of the steering, the acceleration, and the deceleration of the vehicle 1 for at least one of improving safety or comfort of the travel of the vehicle 1, reducing a sense of strangeness or insecurity of an occupant of the vehicle 1, and stabilizing behavior of the vehicle 1. The travel assist control is exemplified by collision avoidance control, lane departure suppression control, damping control, vehicle stability control, and the like. The collision avoidance control assists avoidance of a collision between the vehicle 1 and a surrounding object (namely, an avoidance target). The lane departure suppression control suppresses the vehicle 1 from departing from a travel lane. The damping control suppresses pitching and rolling of the vehicle 1. The vehicle stability control suppresses unstable behavior such as vehicle spin.

Figure 10:
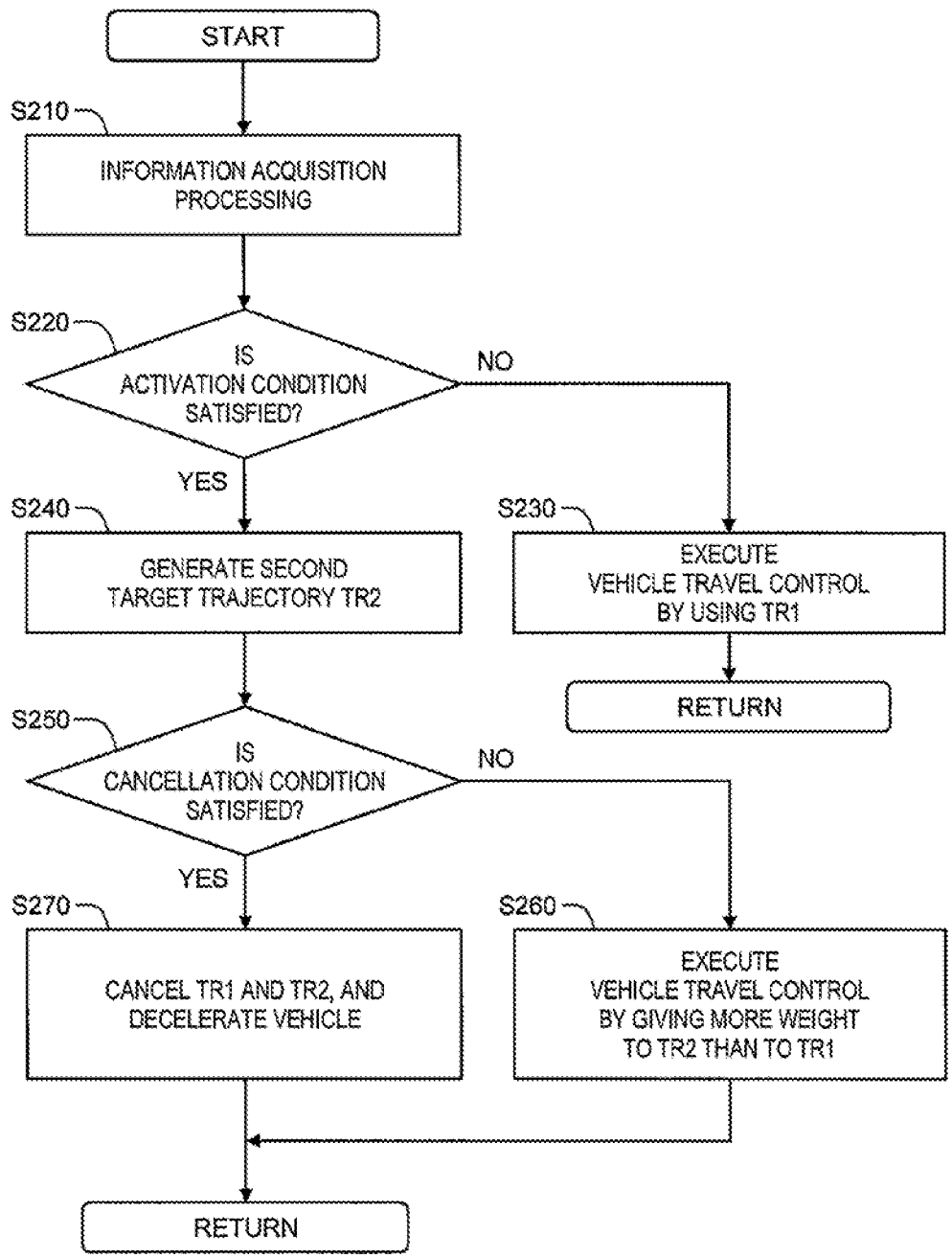
FIG. 10 is a flow chart showing an example of processing related to travel assist control by the vehicle travel control device according to the embodiment of the present disclosure.

FIG. 10 is a flow chart showing an example of processing related to the travel assist control by the second control device 220 (the second processor 221). The process flow shown in FIG. 10 is repeatedly executed at a regular interval. Here, the automated driving of the vehicle 1 is in execution.

3-3-1. Step S210

In Step S210, the second control device 220 acquires the second driving environment information 250 from the second information acquisition device 210. The second driving environment information 250 is stored in the second memory device 222. Moreover, the second control device 220 receives information indicating the first target trajectory TR1 from the automated driving control device 100 via the second input/output interface 230. The information indicating the first target trajectory TR1 is stored in the second memory device 222.

3-3-2. Step S220

In Step S220, the second control device 220 determines whether or not the travel assist control needs to be activated based on the second driving environment information 250. In other words, the second control device 220 determines whether or not the "activation condition" for activating the travel assist control is satisfied, based on the second driving environment information 250.

As an example of the travel assist control, let us consider the collision avoidance control. Based on the second surrounding situation information 254 (the target information), the second control device 220 recognizes an avoidance target (e.g., a surrounding vehicle, a pedestrian) ahead of the vehicle 1. Furthermore, based on the second vehicle state information 253 and the second surrounding situation information 254 (the target information), the second control device 220 predicts respective future positions of the vehicle 1 and the avoidance target and calculates a possibility that the vehicle 1 collides with the avoidance target. The activation condition of the collision avoidance control is that the possibility that the vehicle 1 collides with the avoidance target is equal to or higher than a threshold.

As another example of the travel assist control, let us consider the lane departure suppression control. For example, when the vehicle 1 wobbles within the travel lane and comes close to a lane marking (a white line) of the travel lane, the lane departure suppression control steers the vehicle 1 so as to return back to a center of the travel lane. For that purpose, the second control device 220 recognizes, based on the second surrounding situation information 254, the lane marking of the travel lane in which the vehicle 1 is traveling and monitors a distance between the vehicle 1 and the lane marking. A first activation condition of the lane departure suppression control is that the distance between the vehicle 1 and the lane marking of the travel lane becomes less than a predetermined distance threshold.

In addition, the lane departure suppression control decelerates the vehicle 1 when predicting that the vehicle 1 is not able to turn a curve located ahead of the vehicle 1. For that purpose, the second control device 220 acquires a road shape in front of the vehicle 1 based on the second map information 251 and the second position information 252. Then, the second control device 220 determines, based on the road shape and the second vehicle state information 253 (the vehicle speed, etc.), whether or not the vehicle 1 is able to turn the curve located ahead of the vehicle 1 without departing from the travel lane. At this time, the second control device 220 may perform the determination in consideration of a road surface condition (a road surface friction coefficient). The road surface condition can be estimated by a well-known technique utilizing the second vehicle state information 253 or the second surrounding situation information 254. A second activation condition of the lane departure suppression control is that it is determined that the vehicle 1 is not able to turn the curve located ahead of the vehicle 1 without departing from the travel lane.

When the activation condition of the travel assist control is satisfied (Step S220; Yes), the processing proceeds to Step S230. On the other hand, when the activation condition of the travel assist control is not satisfied (Step S220; No), the processing proceeds to Step S250.

3-3-3. Step S230

The activation condition of the travel assist control is not satisfied, and thus the second target trajectory TR2 is not generated. The second control device 220 executes the vehicle travel control by using the first target trajectory TR1 received from the automated driving control device 100 as the target trajectory TR. That is, the second control device 220 executes the vehicle travel control such that the vehicle 1 follows the first target trajectory TR1. More specifically, the second control device 220 calculates the required control amount CON (i.e., the first required control amount CON1) required for the vehicle 1 to follow the first target trajectory TR1. Then, the second control device 220 controls the operation of the travel device 240, that is, controls at least one of the steering, the acceleration, and the deceleration in accordance with the required control amount CON.

3-3-4. Step S240

The second control device 220 generates the second target trajectory TR2 for the travel assist control. For example, the second target trajectory TR2 for the collision avoidance control demands at least one of the steering and the deceleration of the vehicle 1 in order to avoid the collision with the avoidance target.

As another example, when the first activation condition of the lane departure suppression control is satisfied, the second target trajectory TR2 demands such the steering that returns the vehicle 1 back to the center of the travel lane. When the second activation condition of the lane departure suppression control is satisfied, the second target trajectory TR2 demands the deceleration of the vehicle 1 in order to suppress lane departure at the curve ahead.

The second control device 220 stores information of the second target trajectory TR2 in the second memory device 222. After that, the processing proceeds to Step S250.

3-3-5. Step S250

Both the first target trajectory TR1 for the automated driving and the second target trajectory TR2 for the travel assist control exist coincidentally. The second control device 220 determines whether or not the "cancellation condition" for cancelling both the first target trajectory TR1 and the second target trajectory TR2 is satisfied. At this time, the second control device 220 determines whether or not the cancellation condition is satisfied based on a relationship between the first target trajectory TR1 and the second target trajectory TR2. In other words, the second control device 220 determines whether or not the cancellation condition is satisfied by comparing the first target trajectory TR1 and the second target trajectory TR2.

A typical cancellation condition is that the first target trajectory TR1 and the second target trajectory TR2 contradict each other (see FIG. 3 for example). The second control device 220 determines whether or not the first target trajectory TR1 and the second target trajectory TR2 contradict each other based on the relationship between the first target trajectory TR1 and the second target trajectory TR2. In other words, the second control device 220 determines whether or not the first target trajectory TR1 and the second target trajectory TR2 contradict each other by comparing the first target trajectory TR1 and the second target trajectory TR2.

A variety of concrete examples of the cancellation condition will be described later. When the cancellation condition is not satisfied (Step S250; No), the processing proceeds to Step S260. On the other hand, when the cancellation condition is satisfied (Step S250; Yes), the processing proceeds to Step S270.

3-3-6. Step S260

The second control device 220 arbitrates between the first target trajectory TR1 and the second target trajectory TR2. In particular, the second control device 220 executes the vehicle travel control by giving more priority to the second target trajectory TR2 than to the first target trajectory TR1. In other words, the second control device 220 executes the vehicle travel control by giving more "weight" to the second target trajectory TR2 than to the first target trajectory TR1.

Figure 11:
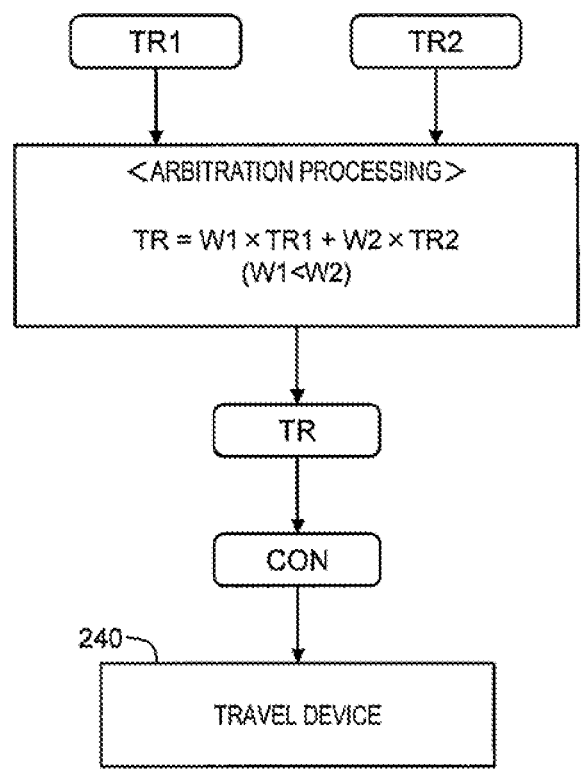
FIG. 11 is a conceptual diagram showing an example of processing in Step S260 in FIG. 10.

FIG. 11 is a conceptual diagram showing an example of the processing in Step S260. The second control device 220 performs arbitration processing that determines a definitive target trajectory TR based on the first target trajectory TR1 and the second target trajectory TR2. The target trajectory TR is expressed by the following Equation (1).

$$TR = W1 \times TR1 + W2 \times TR2 \qquad \text{Equation (1):}$$

A first weight W1 is a weight of the first target trajectory TR1 with respect to the target trajectory TR. A second weight W2 is a weight of the second target trajectory TR2 with respect to the target trajectory TR. The second weight W2 is greater than the first weight W1 (i.e., W2>W1). In other words, the first weight W1 is equal to or greater than 0 and less than 0.5, and the second weight W2 is greater than 0.5 and equal to or less than 1. The first weight W1 being 0 and the second weight W2 being 1 are equivalent to that the second target trajectory TR2 is selected as the target trajectory TR.

The second control device 220 calculates the required control amount CON required for the vehicle 1 to follow the target trajectory TR. Then, the second control device 220 controls the operation of the travel device 240, that is, controls at least one of the steering, the acceleration, and the deceleration in accordance with the required control amount CON.

Figure 12:
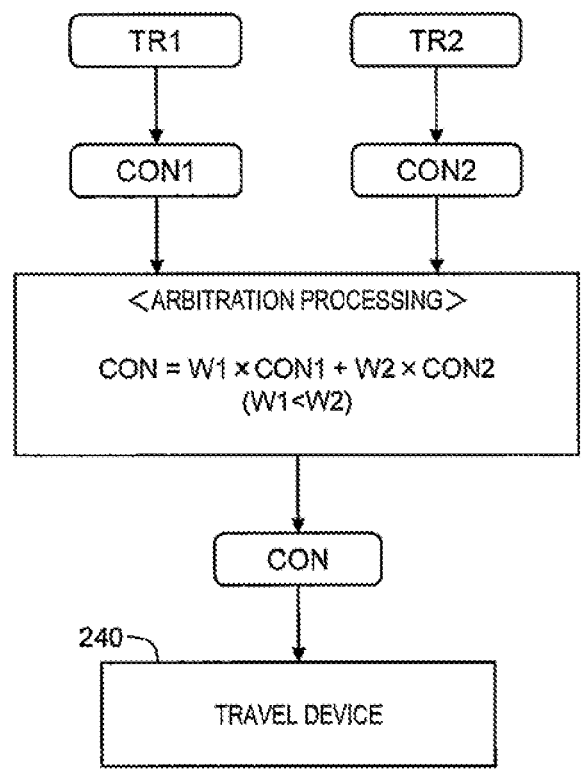
FIG. 12 is a conceptual diagram showing another example of processing in Step S260 in FIG. 10.

FIG. 12 is a conceptual diagram showing another example of the processing in Step S260. The processing shown in FIG. 12 also is included in "the executing the vehicle travel control by giving more weight to the second target trajectory TR2 than to the first target trajectory TR1."

More specifically, the second control device 220 calculates the required control amount CON required for the vehicle 1 to follow the first target trajectory TR1 as a "first required control amount CON1." In addition, the second control device 220 calculates the required control amount CON required for the vehicle 1 to follow the second target trajectory TR2 as a "second required control amount CON2." Then, the second control device 220 performs arbitration processing that determines a definitive required control amount CON by combining the first required control amount CON1 and the second required control amount CON2. The required control amount CON is expressed by the following Equation (2).

$$CON = W1 \times CON1 + W2 \times CON2 \qquad \text{Equation (2):}$$

A first weight W1 is a weight of the first required control amount CON1 with respect to the required control amount CON. A second weight W2 is a weight of the second required control amount CON2 with respect to the required control amount CON. The second weight W2 is greater than the first weight W1 (i.e., W2>W1). In other words, the first weight W1 is equal to or greater than 0 and less than 0.5, and the second weight W2 is greater than 0.5 and equal to or less than 1. The first weight W1 being 0 and the second weight W2 being 1 are equivalent to that the second required control amount CON2 is selected as the required control amount CON.

When the required control amount CON is determined, the second control device 220 controls the operation of the travel device 240, that is, controls at least one of the steering, the acceleration, and the deceleration in accordance with the required control amount CON. The processing shown in FIG. 12 also brings about the same effects as in the case of FIG. 11.

3-3-7. Step S270

The second control device 220 cancels (abandons) both the first target trajectory TR1 and the second target trajectory TR2. Instead, the second control device 220 executes the vehicle travel control such that the vehicle 1 decelerates. Preferably, the second control device 220 executes the vehicle travel control such that the vehicle 1 decelerates and stops.

Figure 13:
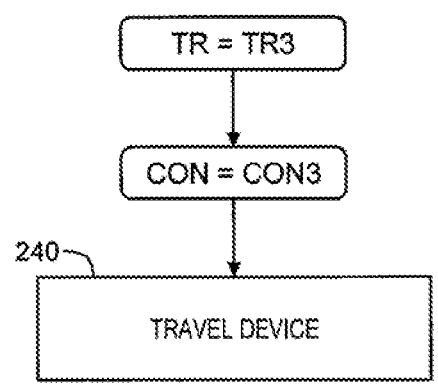
FIG. 13 is a conceptual diagram showing an example of processing in Step S270 in FIG. 10.

FIG. 13 is a conceptual diagram showing an example of the processing in Step S270. The second control device 220 generates the third target trajectory TR3 for decelerating the vehicle 1. Then, the second control device 220 executes the vehicle travel control by using the third target trajectory TR3 as the target trajectory TR. That is, the second control device 220 executes the vehicle travel control such that the vehicle 1 follows the third target trajectory TR3. More specifically, the second control device 220 calculates a third required control amount (i.e., a deceleration control amount) CON3 required for the vehicle 1 to follow the third target trajectory TR3. Then, the second control device 220 controls the operation of the travel device 240 (i.e., the braking device 243) in accordance with the third required control amount CON3 to decelerate the vehicle 1.

As another example, the second control device 220 may directly calculate the third required control amount CON3 for controlling the braking device 243, without generating the third target trajectory TR3.

4. VARIOUS EXAMPLES OF CANCELLATION CONDITION

Hereinafter, various examples of the cancellation condition will be described. When at least any cancellation condition is satisfied (Step S250; Yes), the processing proceeds to Step S270.

4-1. First Example

In the following description, a "first steering direction" is a steering direction required for the vehicle 1 to follow the first target trajectory TR1, that is, a steering direction required by the automated driving control device 100. On the other hand, a "second steering direction" is a steering direction required for the vehicle 1 to follow the second target trajectory TR2, that is, the steering direction required by the travel assist control.

A first example of the cancellation condition is that the first target trajectory TR1 and the second target trajectory TR2 contradict each other. More specifically, the first example of the cancellation condition is that "the first steering direction and the second steering direction are opposite to each other" (see FIG. 3).

The second control device 220 can determine whether or not the first steering direction and the second steering direction are opposite to each other by comparing the first target trajectory TR1 and the second target trajectory TR2 by using the second position information 252 (the position and orientation of the vehicle 1) as a basis. Alternatively, the second control device 220 may calculate the first required control amount CON1 and the second required control amount CON2 described above and compare the first required control amount CON1 and the second required control amount CON2 to determine whether or not the first example of the cancellation condition is satisfied. In the present example, the first required control amount CON1 includes a first steering control amount for steering in the first steering direction, and the second required control amount CON2 includes a second steering control amount for steering in the second steering direction.

4-2. Second Example

A second example of the cancellation condition also is that the first target trajectory TR1 and the second target trajectory TR2 contradict each other. More specifically, the second example of the cancellation condition is that "the steering is required for the vehicle 1 to follow one of the first target trajectory TR1 and the second target trajectory TR2, and the acceleration is required for the vehicle 1 to follow the other of them."

The second control device 220 can determine whether or not the second example of the cancellation condition is satisfied by comparing the first target trajectory TR1 and the second target trajectory TR2. Alternatively, the second control device 220 may calculate the first required control amount CON1 and the second required control amount CON2 described above and compare the first required control amount CON1 and the second required control amount CON2 to determine whether or not the second example of the cancellation condition is satisfied. In the present example, one of the first required control amount CON1 and the second required control amount CON2 includes a steering control amount for steering, and the other of them includes an acceleration control amount for accelerating.

4-3. Third Example

A third example of the cancellation condition is that a "gap" between the first target trajectory TR1 and the second target trajectory TR2 exceeds a certain level. More specifically, the third example of the cancellation condition is that "a gap (difference) between the first required control amount CON1 and the second required control amount CON2 of the same kind exceeds a gap threshold."

For example, a case where the first required control amount CON1 includes a first steering control amount for steering, and the second required control amount CON2 includes a second steering control amount for steering is considered. In this case, the third example of the cancellation condition is that "a gap between the first steering control amount and the second steering control amount exceeds a steering gap threshold."

As another example, a case where the first required control amount CON1 includes a first acceleration control amount for accelerating, and the second required control amount CON2 includes a second acceleration control amount for accelerating is considered. In this case, the third example of the cancellation condition is that "a gap between the first acceleration control amount and the second acceleration control amount exceeds an acceleration gap threshold."

As yet another example, a case where the first required control amount CON1 includes a first deceleration control amount for decelerating, and the second required control amount CON2 includes a second deceleration control amount for decelerating is considered. In this case, the third example of the cancellation condition is that "a gap between the first deceleration control amount and the second deceleration control amount exceeds a deceleration gap threshold."

The second control device 220 calculates the first required control amount CON1 and the second required control amount CON2 described above. Then, the second control device 220 compare the first required control amount CON1 and the second required control amount CON2 to determine whether or not the third example of the cancellation condition is satisfied.

4-4. Fourth Example

In the following description, a "first lateral acceleration" is a lateral acceleration required for the vehicle 1 to follow the first target trajectory TR1, that is, a lateral acceleration required by the automated driving control device 100. On the other hand, a "second lateral acceleration" is a lateral acceleration required for the vehicle 1 to follow the second target trajectory TR2, that is, a lateral acceleration required by the travel assist control. A lateral acceleration threshold is an upper limit of a lateral acceleration range desired in terms of stable behavior of the vehicle 1. When the lateral acceleration of the vehicle 1 exceeds the lateral acceleration threshold, the vehicle 1 becomes a high lateral acceleration state.

A fourth example of the cancellation condition is that "the first lateral acceleration is higher than the lateral acceleration threshold and the second lateral acceleration is further higher than the first lateral acceleration" (see FIG. 4).

The second control device 220 calculates the first required control amount CON1 and the second required control amount CON2. The first required control amount CON1 includes a first travel control amount for generating the first lateral acceleration. The second required control amount CON2 includes a second travel control amount for generating the second lateral acceleration. The second control device 220 can determine whether or not the fourth example of the cancellation condition is satisfied by comparing the first required control amount CON1 and the second required control amount CON2.

When the fourth example of the cancellation condition is satisfied, the second control device 220 cancels both the first target trajectory TR1 and the second target trajectory TR2, and decelerates the vehicle 1. As a result, the high lateral acceleration state is resolved and thus the vehicle behavior is stabilized.

4-5. Fifth Example

In the following description, a "first deceleration" is a deceleration required for the vehicle 1 to follow the first target trajectory TR1, that is, a deceleration required by the automated driving control device 100. On the other hand, a "second deceleration" is a deceleration required for the vehicle 1 to follow the second target trajectory TR2, that is, a deceleration required by the travel assist control. A deceleration threshold is an upper limit of a deceleration range desired in terms of stable behavior of the vehicle 1. When the deceleration of the vehicle 1 exceeds the deceleration threshold, the vehicle 1 becomes a high deceleration state.

A fifth example of the cancellation condition is that "the first deceleration is higher than the deceleration threshold and the second deceleration is further higher than the first deceleration."

The second control device 220 calculates the first required control amount CON1 and the second required control amount CON2. The first required control amount CON1 includes a first deceleration control amount for generating the first deceleration. The second required control amount CON2 includes a second deceleration control amount for generating the second deceleration. The second control device 220 can determine whether or not the fifth example of the cancellation condition is satisfied by comparing the first required control amount CON1 and the second required control amount CON2.

When the fifth example of the cancellation condition is satisfied, the second control device 220 cancels both the first deceleration and the second deceleration, and decelerates the vehicle 1 at a third deceleration. The third deceleration is lower than the first deceleration and the second deceleration, and preferably set to be equal to or lower than the deceleration threshold. As a result, the high deceleration state is resolved and thus the vehicle behavior is stabilized.

5. MODIFICATION EXAMPLES

5-1. First Modification Example

The activation condition of the travel assist control in Step S220 may be variably set according to an operating state of the vehicle 1.

As an example, let us consider a case where a driver operates the vehicle 1 manually. In this case, the travel assist control is expected to make up for the driver's mistake in the manual driving operation. However, if the travel assist control is activated too early, the manual driving operation by the driver is hindered and thus comfort is deteriorated. In view of the above, in the case of the manual driving, the activation condition is set so that the travel assist control is less likely to be activated as compared with the case of the automated driving. Moreover, the activation condition is set so that the travel assist control is more likely to be activated as the automated driving level becomes higher.

As another example, let us consider a case where an operator of a control center remotely controls the vehicle 1. In the case of the remote control, the operator recognizes an object by checking camera image transmitted from the vehicle 1 and the like, and issues an instruction to the vehicle 1. However, a delay and/or a mistake in the object recognition and the instruction timing may occur due to communication delay and/or limited camera performance (angle of view, resolution). In view of the above, in the case of the remote control, the activation condition is set so that the travel assist control is more likely to be activated as compared with the other cases.

5-2. Second Modification Example

Figure 14:
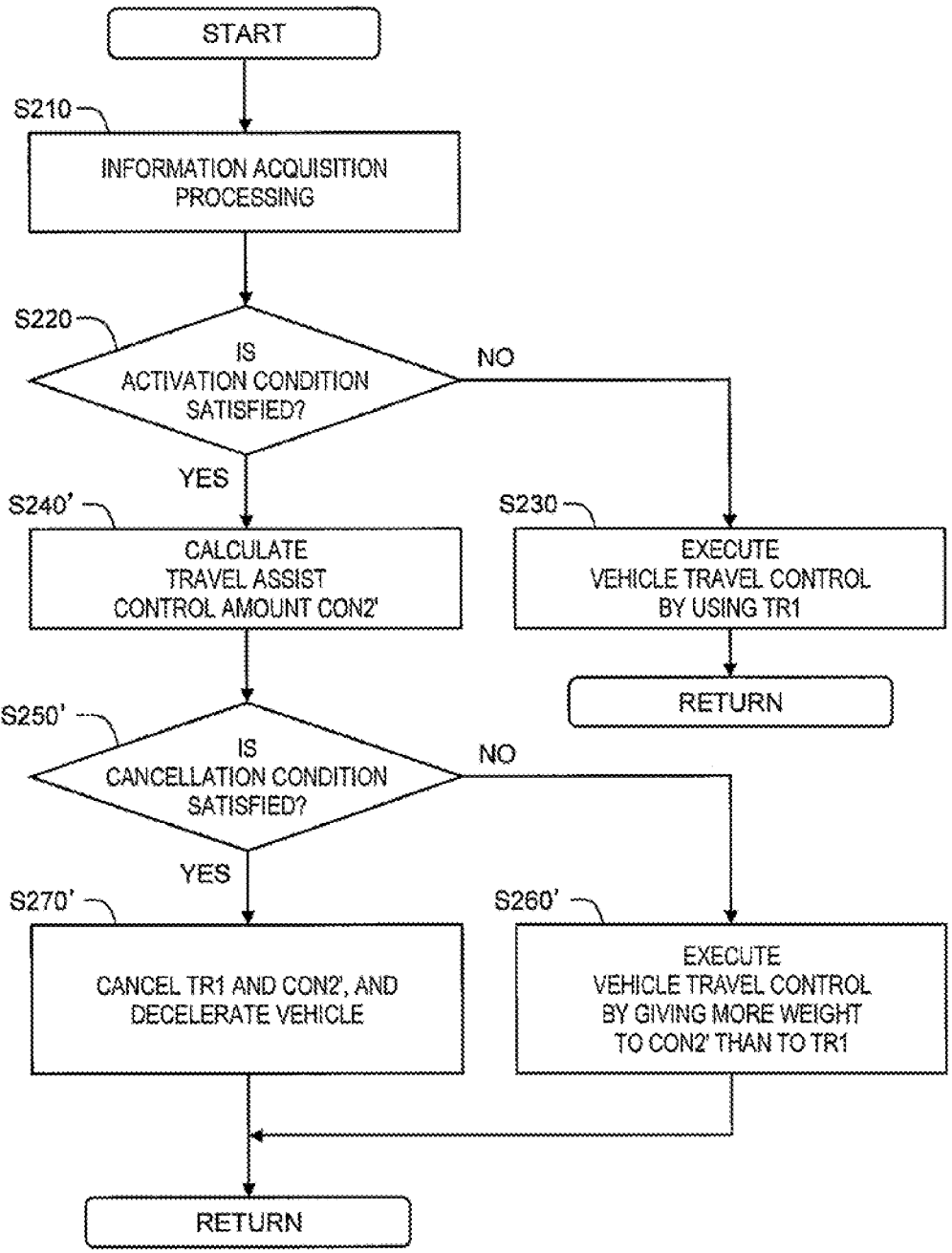
FIG. 14 is a flow chart showing a second modification example of the embodiment of the present disclosure.

FIG. 14 is a flow chart showing a second modification example of the present embodiment. Compared to the flow chart shown in FIG. 10, Steps S240 to S270 are replaced with Steps S240' to S270', respectively.

In Step S240', the second control device 220 directly calculates the control amount of the travel device 240 for the travel assist control without generating the second target trajectory TR2. The control amount of at least one of the steering, the acceleration, and the deceleration required for the travel assist control is hereinafter referred to as a "travel assist control amount CON2'." For example, the second control device 220 calculates the travel assist control amount CON2' of at least one of the steering and the deceleration required for avoiding a collision with the avoidance target. The travel assist control amount CON2' corresponds to the second required control amount CON2 described above.

The "second target trajectory TR2" in the above-described embodiment is replaced with the "travel assist control amount CON2'." That is, in Step S250', the second control device 220 determines whether or not the cancellation condition for cancelling both the first target trajectory TR1 and the travel assist control amount CON2' is satisfied. At this time, the second control device 220 determines whether or not the cancellation condition is satisfied by comparing the first target trajectory TR1 and the travel assist control amount CON2'. In other words, the second control device 220 determines whether or not the cancellation condition is satisfied by comparing the first required control amount CON1 and the travel assist control amount CON2'.

When the cancellation condition is not satisfied (Step S250'; No), the processing proceeds to Step S260'. In Step S260', the second control device 220 executes the vehicle travel control by giving more weight to the travel assist control amount CON2' than to the first target trajectory TR1. In other words, the second control device 220 executes the vehicle travel control by giving more weight to the travel assist control amount CON2' than to the first required control amount CON1 (see FIG. 12).

On the other hand, when the cancellation condition is satisfied (Step S250'; Yes), the processing proceeds to Step S270'. In Step S270', the second control device 220 cancels both the first target trajectory TR1 and the travel assist control amount CON2'. Instead, the second control device 220 executes the vehicle travel control such that the vehicle 1 decelerates.

The same effects as in the case of the above-described embodiment can be obtained even by the present modification example.

5-3. Third Modification Example

Figure 15:
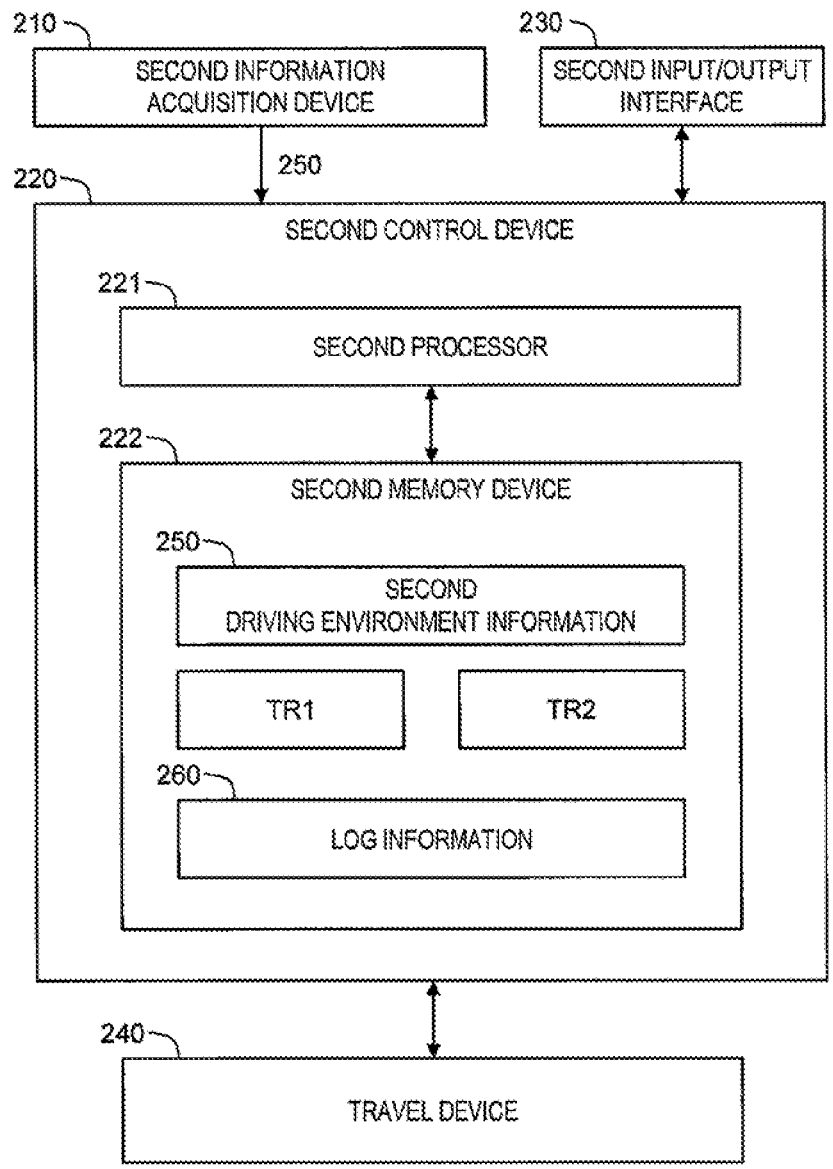
FIG. 15 is a block diagram showing a configuration of the vehicle travel control device according to a third modification example of the embodiment of the present disclosure.

FIG. 15 is a block diagram showing a configuration of the vehicle travel control device 200 according to a third modification example of the present embodiment. The second control device 220 (the second processor 221) generates log information 260 regarding the above-described Step S270 (or Step S270'), and stores the log information 260 in the second memory device 222.

The log information 260 includes at least a position where Step S270 (or Step S270') has been executed. That is, the log information 260 includes at least a position where the cancellation condition has been satisfied. The log information 260 may include the first target trajectory TR1 and the second target trajectory TR2. The log information 260 may include the second driving environment information 250 acquired in a certain period of time including a timing when the cancellation condition has been satisfied.

Such the log information 260 is useful. For example, it is possible to exclude the position where the cancellation condition has been satisfied from an automated driving permitted zone (or ODD (Operational Design Domain)). As another example, it is possible to analyze a difference between the first target trajectory TR1 and the second target trajectory TR2. As yet another example, it is possible to analyze a reason of inconsistency between the first target trajectory TR1 and the second target trajectory TR2.

The second control device 220 may transmit the log information 260 to an automated driving management server through the second communication device 215. The automated driving management server performs setting of the automated driving permitted zone and various analyses based on the log information 260.

5-4. Fourth Modification Example

Figure 16:
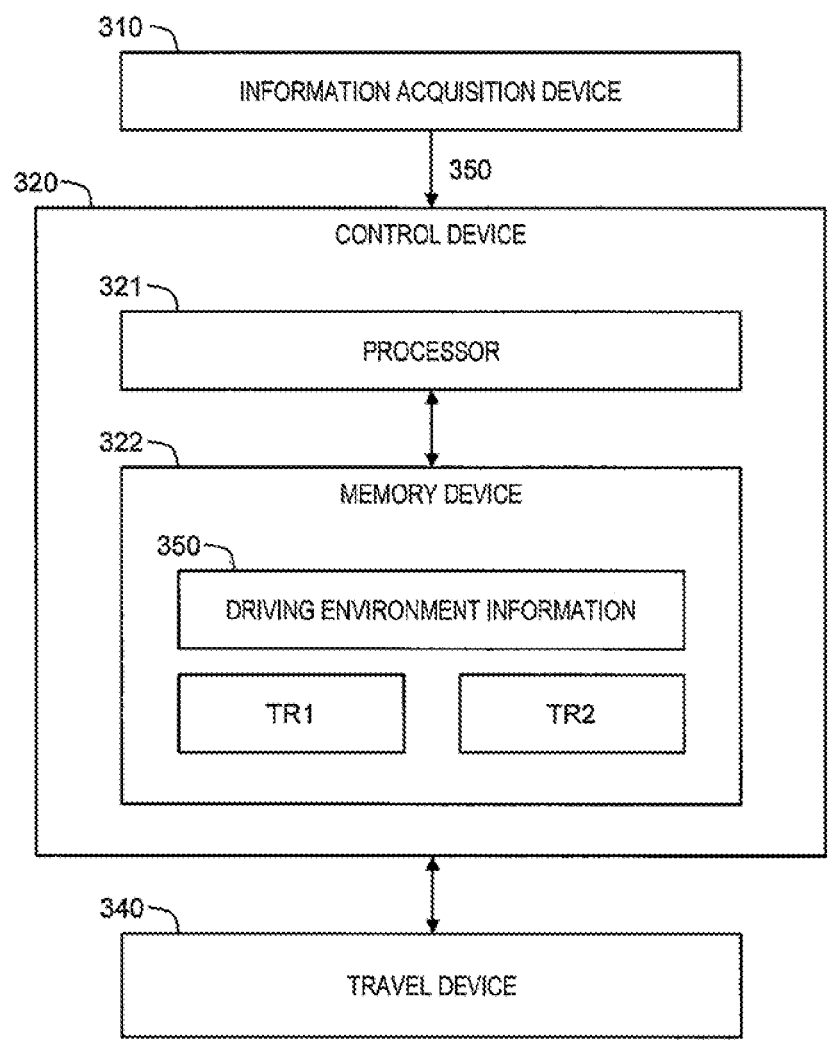
FIG. 16 is a block diagram showing a configuration of the vehicle control system according to a fourth modification example of the embodiment of the present disclosure.

FIG. 16 is a block diagram showing a configuration of the vehicle control system 10 according to a fourth modification example of the present embodiment. The vehicle control system 10 includes an information acquisition device 310, a control device 320, and a travel device 340.

The information acquisition device 310 acquires driving environment information 350. The information acquisition device 310 is the same as the first information acquisition device 110 or the second information acquisition device 210. The driving environment information 350 is the same as the first driving environment information 150 or the second driving environment information 250. The travel device 340 is the same as to the travel device 240.

The control device 320 includes a processor 321 and a memory device 322. A variety of information is stored in the memory device 322. For example, the driving environment information 350 acquired by the information acquisition device 310 is stored in the memory device 322. The processor 321 executes a control program. The control program is stored in the memory device 322 or recorded on a computer-readable recording medium. A variety of processing by the control device 320 is realized by the processor 321 executing the control program.

The control device 320 has both of the function of the first control device 120 of the automated driving control device 100 and the function of the second control device 220 of the vehicle travel control device 200. That is, the information acquisition device 310 and the control device 320 correspond to the automated driving control device 100, and the information acquisition device 310, the control device 320, and the ravel device 340 correspond to the vehicle travel control device 200.

A generalization is as follows. The vehicle control system 10 according to the present embodiment includes one processor (i.e., the processor 321) or a plurality of processors (i.e., the first processor 121 and the second processor 221). The one or more processors executes the processing as the automated driving control device 100 and the vehicle travel control device 200 based on the driving environment information stored in one or more memory devices.

What is claimed is:

1. A vehicle control system that controls a vehicle performing automated driving,
the vehicle control system comprising:
a vehicle travel control device configured to execute vehicle travel control that controls steering, acceleration, and deceleration of the vehicle such that the vehicle follows a target trajectory; and
an automated driving control device configured to generate a first target trajectory being the target trajectory for the automated driving of the vehicle, wherein
the vehicle travel control device is further configured to:
determine whether or not an activation condition of travel assist control is satisfied, wherein the travel assist control controls at least one of the steering, the acceleration, and the deceleration for at least one of improving safety or comfort of travel of the vehicle, and stabilizing behavior of the vehicle; and
when the activation condition is satisfied, calculate a travel assist control amount that is a control amount of at least one of the steering, the acceleration, and the deceleration required for the travel assist control,
when the activation condition is satisfied and the travel assist control amount is calculated in addition to the first target trajectory during the automated driving, the vehicle travel control device compares the first target trajectory and the travel assist control amount to determine, based on a relationship between the first target trajectory and the travel assist control amount, whether or not a cancellation condition for cancelling both the first target trajectory and the travel assist control amount is satisfied, and
when the cancellation condition is satisfied, the vehicle travel control device cancels both the first target trajectory and the travel assist control amount, and decelerates the vehicle.

* * * * *